Feb. 15, 1949.                A. J. HIERTZ                2,462,040
                             PIPE CONNECTION
                          Filed June 19, 1945

INVENTOR.
Arthur J. Hiertz
BY
Kenyon & Kenyon
ATTORNEYS

Patented Feb. 15, 1949

2,462,040

UNITED STATES PATENT OFFICE 2,462,040

PIPE CONNECTION

Arthur J. Hiertz, Bridgeport, Conn., assignor to Bridgeport Brass Company, Bridgeport, Conn., a corporation of Connecticut Application June 19, 1945, Serial No. 600,267

3 Claims. (Cl. 285—122)

This invention relates to pipe connections and more particularly to connections between the ends of pipes employed in trap joint installations.

There are two different types of connections used in trap joint installations. The trap itself consists of two tubes, one of which is known in the trade as the J tube and the other of which is known in the trade as the floor or wall tube, the ends of these tubes being interconnected by an easily made or unmade joint. In one type joint, reliance is placed on a washer or gasket for producing a water-tight seal and in the other type a water-tight seal is obtained by direct engagement of metal surfaces. There is a fairly evenly divided preference in the plumbing trade for these two types of joints, each of which has heretofore differed from the other with respect to the shape of the end of the floor or wall tube as well as the arrangement at the end of the J tube. This circumstance has required that plumbing supply houses carry stocks of both types of connections in order to supply the demand of the trade.

An object of this invention is means for interconnecting J tubes and floor tubes of such construction that a water-tight seal may be obtained either by use of a gasket or through the medium of metal-to-metal contact, thereby obviating the need for manufacturing and stocking two different lines of trap-forming tubes.

Other objects, novel features and advantages of this invention will become apparent from the following specification and accompanying drawings, wherein.

Figure 1:
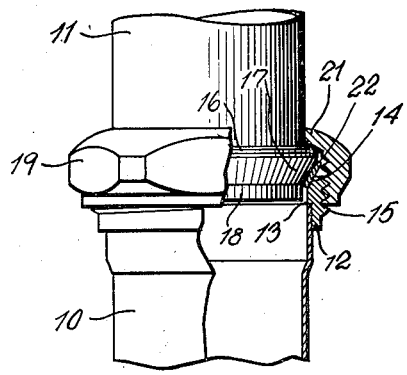
Fig. 1 illustrates the invention as utilized in a gasket type joint.

In the drawings are illustrated merely the end portions of a J tube 10 and a floor or wall tube 11 which co-operate to form a trap in the well-known manner. The J tube 10 for a short distance from its end is of slightly larger diameter than the remainder of the tube and a collar 12 mounted on said enlargement is sealed to the tube by solder or the like. The collar 12 has a shoulder 13 engaging the end of the J tube 10 and is provided with an internal conical surface 14 converging toward the tube 10 and with an external thread 15. Near its end, the tube 11 is formed with a portion 16 of greater diameter than the remainder of the tube and having a conical surface 17 complementary to the surface 14 and converging toward the end of the tube. The surface 17 terminates along a peripheral line somewhat removed from the end of the tube 11 to provide a section 18 of substantially the same diameter as the major portion of the tube.

A nut 19 has a thread 20 complementary to the thread 15 of the collar 12. It also has an inwardly directed flange 21, the interior surface of which is of slightly larger diameter than the surface of the tube 11 so that the flange 21 is engageable with the enlarged diameter portion 16 of the tube 11.

Figure 3:
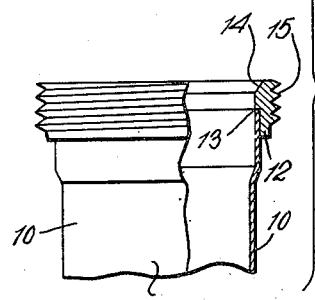
Fig. 3 is an exploded view.

In utilizing the arrangement above described to form a washer-type joint, a washer or gasket 22 of suitable shape and size is applied to the tube section 18 and the two tubes and the nut 19 are arranged as shown in Fig. 3. The end of the tube 11 is then inserted into the collar 12 to locate the gasket 22 between the surfaces 14 and 17, after which the nut 19 is threaded onto the collar 12 as shown in Fig. 1. In this arrangement, the section 18 of the tube 11 does not project into the enlarged end portion of the tube 10.

Figure 2:
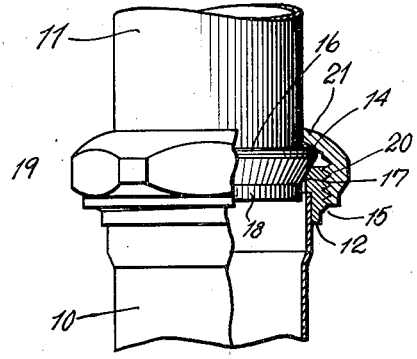
Fig. 2 illustrates the invention as utilized in a ground joint.

In utilizing the arrangement above described to form a ground joint, the gasket 22 is discarded and the end of the tube 11 is introduced into the collar 16 to bring the surface 17 into contact with the surface 14 after which the nut 19 is threaded onto the collar 12. In this arrangement, the section 18 of the tube 11 projects slightly into the end of the tube 10 as shown in Fig. 2.

In the production of a washer type joint, the section 18 of the tube 11 serves as a carrier for the washer 22 while the tube 11 is brought into proper relation to the tube 10. Upon insertion of the tube 11 into the end of the tube 10, the gasket 22 is moved into position to have its opposite faces engaging the surfaces 14 and 17. The portion 18 also constitutes a reinforcement to minimize the possibility of deformation of the conical surface 17 prior to its engagement with the surface 14 in the production of a ground type joint. The washer 22 is of standard type with sufficient flexilibity to allow for assembly on the section 18.

Figure 4:
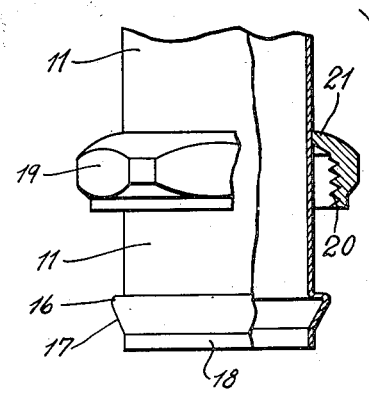
Fig. 4 illustrates a modification.
Figure 4:
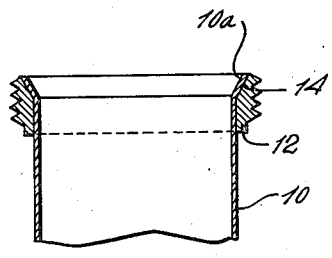

As shown in Fig. 4, the collar 12 may be formed without the shoulder 13 and may be mounted on a tube 10 with the end of the latter flared outwardly as shown at 10a into contact with the conical surface 14 of the collar and the collar may be soldered to the tube. With this arrangement, the conical inner surface of the flared portion 10a is engaged either by a surface of the gasket 22 or by the surface 17, depending upon whether a washer-type joint or a ground joint is desired.

It is of course understood that various modifications may be made in the structure above described without in any way departing from the spirit of the invention as defined in the appended claims.

I claim:

1. A pipe joint including cooperating metal male and female tapered seats formed to provide cooperatively a fluid-tight metal-to-metal junction when forced directly together, and with the male seat tapering to a smaller minimum diameter than the minimum diameter of the female seat and having a holder for a non-metallic gasket projecting forwardly therefrom, whereby when desired a non-metallic gasket may be positioned parallel the male seat with said holder restraining the gasket from sliding off due to the taper of the male seat, and a fastening for holding said seats forced together both in direct contact and when spaced by the use of said gasket, the joint being formed to provide clearance for said holder when said gasket is not used and said fastening forces the seats directly together.

2. A joint as defined by claim 1 with said gasket holder comprising a short tubular part projecting forwardly from said male seat at a different angle than the latter's taper, whereby to restrain a flexible gasket fitted flatly thereon against wedging off due to the male seat's taper.

3. A plumbing pipe joint adapted to function as either a ground or washer type and including adjacent tube ends provided respectively with cooperating metal male and female tapered seats formed to provide cooperatively a ground type or metal-to-metal fluid-tight junction when forced directly together, the tube end with the male seat also having a cylindrical extension projecting a short distance forwardly in front of its seat, whereby to restrain a flexible non-metallic washer or gasket flexed onto the male seat from wedging itself off when a washer type joint is desired, the tube end with the female seat being enlarged in diameter respecting said extension to provide clearance for the same when the joint is operating as the ground type without using a washer, and the female seat having a larger minimum diameter than the male seat whereby to cooperate therewith both when the washer is used and when the two seats directly contact, and a screw fastening for holding said tube ends forced together regardless of whether the washer is used.

ARTHUR J. HIERTZ.

REFERENCES CITED

The following references are of record in the file of this patent:

UNITED STATES PATENTS

| Number | Name | Date |
| --- | --- | --- |
| 188,213 | Weiss | Mar. 6, 1877 |
| 918,843 | Glidden | Apr. 20, 1909 |
| 1,533,886 | Mueller et al. | Apr. 14, 1925 |

FOREIGN PATENTS

| Number | Country | Date |
| --- | --- | --- |
| 28,949 | Great Britain | Dec. 31, 1903 |
| 29,811 | Great Britain | May 5, 1910 |
| 143,432 | Great Britain | May 27, 1920 |